A. S. OLIVER AND J. S. GRUBER.
FISH LURE.
APPLICATION FILED MAY 16, 1918.
1,359,618.
Patented Nov. 23, 1920.
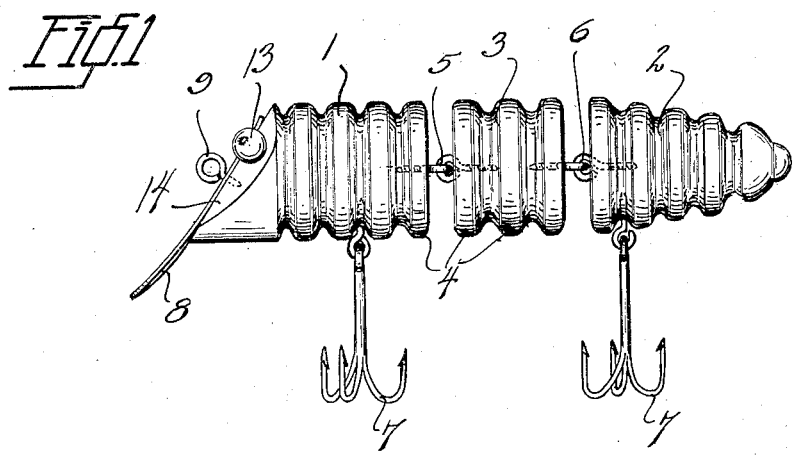
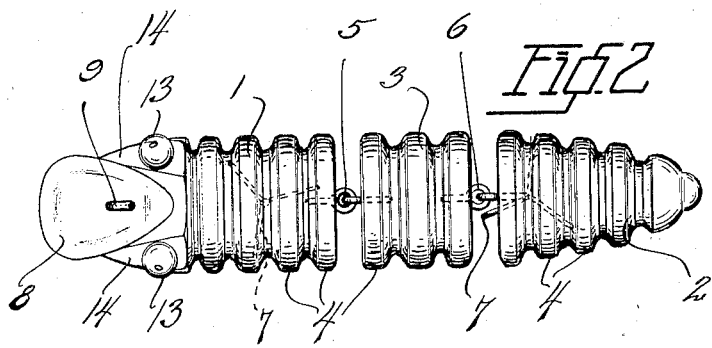
Inventors
Alfred S. Oliver
James S. Gruber
By Herbert E. Smith
Attorney

UNITED STATES PATENT OFFICE.

ALFRED S. OLIVER AND JAMES S. GRUBER, OF MEDICAL LAKE, WASHINGTON.

FISH-LURE.

1,359,618.

Specification of Letters Patent. Patented Nov. 23, 1920.

Application filed May 16, 1918. Serial No. 234,913.

*To all whom it may concern:*

Be it known that we, ALFRED S. OLIVER and JAMES S. GRUBER, citizens of the United States, residing at Medical Lake, in the county of Spokane and State of Washington, have invented certain new and useful Improvements in Fish-Lures, of which the following is a specification.

The present invention relates to an improved fish lure to be used on a fish line and is designed especially to provide for a free movement or motion as the baited device is dragged through the water, or when the currents of water are strong enough to move the lure.

The primary object of the invention is the provision of a device of this character that will follow a true and accurate course as it is dragged, by line, through the water, and will assume the movements of an animated lure or bait, and will also have the general appearance of bait of this nature.

The invention consists in essence, in the utilization of sections of coupled parts in order to provide for flexibility and movement of the device, and in connection therewith of a guide plate or spoon, preferably at the front of the device, by which the preferred horizontal course of the lure may be maintained, against the tendency of the line to pull the lure out of the water, as it is dragged under the water during the operation of fishing, and further the invention consists in certain novel combinations and arrangements of parts as will be hereinafter more particularly pointed out and claimed.

In the accompanying drawings one complete example is illustrated, constructed and arranged according to the best modes so far devised for the practical application of the principles of the invention, and of great success in actual use.

Figure 1 is a side elevation of a lure embodying the present invention.

Fig. 2 is a top plan view of the device.

In the preferred embodiment of the invention, the lure is made up of the head, tail, and intermediate sections indicated respectively as 1, 2, and 3, and these parts which form the body of the lure, are preferably made of wood, the front and intermediate sections being preferably cylindrical, and the rear or tail end being tapered as shown. Preferably the surface of the body is corrugated, and the rings 4 are painted with a brilliant paint, as gold color, so that the painted rings will flash in the water. The corrugations or rings 4 also serve to throw, or cause to be thrown, a wake, as the lure is drawn through the water, thus giving the further appearance of an animated lure.

The sections of the body are coupled together at 5 and 6, by screw eyes that are screwed into the center of the alined body sections, and the front and rear, or head and tail sections are provided with the usual fish-hooks as 7 attached at the underside of the lure.

The forward end of the lure has an inclined face upon which the flat shield or spoon 8 is attached. The shield or spoon is preferably of metal and the body thereof extends below the body of the lure, and is in position so that when the line, which is attached to the eye 9 on the front of the device, is drawn through the water, the tendency of the shield or spoon is to guide the lure downwardly. The pull on the fish line attached to the screw eye 9 is of course forward and upward, and thus the upward pull is neutralized by the guide plate or spoon which tends to guide the lure downwardly. The resistance of the water against the spoon 8 at the head of the lure is sufficient to cause the head piece to dive which in turn wiggles the following sections. There is also a side movement in a similar manner, and as this movement is constant, a distinct wiggle is secured. The rings and grooves along the body serve to brighten the object and tend to give a flash effect as the water passes from one ring to the other, leaving a slight vacuum in the grooves or grooved spaces. The sections are each made so that the movement imparted is limited by the edges of the adjacent sections coming together, and this opening caused by the movement of the sections at the joints also assists in producing the luminous appearance of the lure and enhances the similitude to a natural bait. Drawing the lure through the water in this manner causes the coupled sections to give the lure the appearance of wiggling, and the loose, universal couplings 5 and 6 permit the body to be flexed in substantially all directions.

Preferably the lure is provided with eyes indicated by the protuberances 13 which simulate the eyes of the worm imitated and give the appearance of the natural object.

By the utilization of the lure shown and described herein a device is provided which, because of its front guide shield, follows a true and accurate course and eliminates the objectionable features of darting or dodging, common to many devices used for this purpose. The fact that the shield or guide plate at the front of the device holds the lure in a straight course, also eliminates the necessity for sinkers on the line ahead of the lure, and the sinkers may thus be dispensed with, and furthermore the guide plate holds the lure at the desired depth in the water. On the flattened faces 14 below the eyes, a vivid color is usually painted to provide a proper flash in the water, in order to add to the appearance of animation.

We claim:—

A fish lure comprising a plurality of members circular in cross section, arranged in end to end relation and provided with annular grooves and rings having contrasting bright and dark colors, the forward member having an inclined front end, said members having their connecting ends perpendicular to their longitudinal axes, a separate joint between each adjacent pair of ends holding the ends spaced so that they will contact when the members are swung upon the joint, an inclined spoon secured to the forward inclined end of the front member, and hooks secured to certain of the members.

In testimony whereof we affix our signatures.

ALFRED S. OLIVER.
JAMES S. GRUBER.